Sept. 14, 1926.
G. A. RICHTER
1,599,488
METHOD OF MAKING SULPHITE COOKING LIQUORS
Filed July 19, 1922
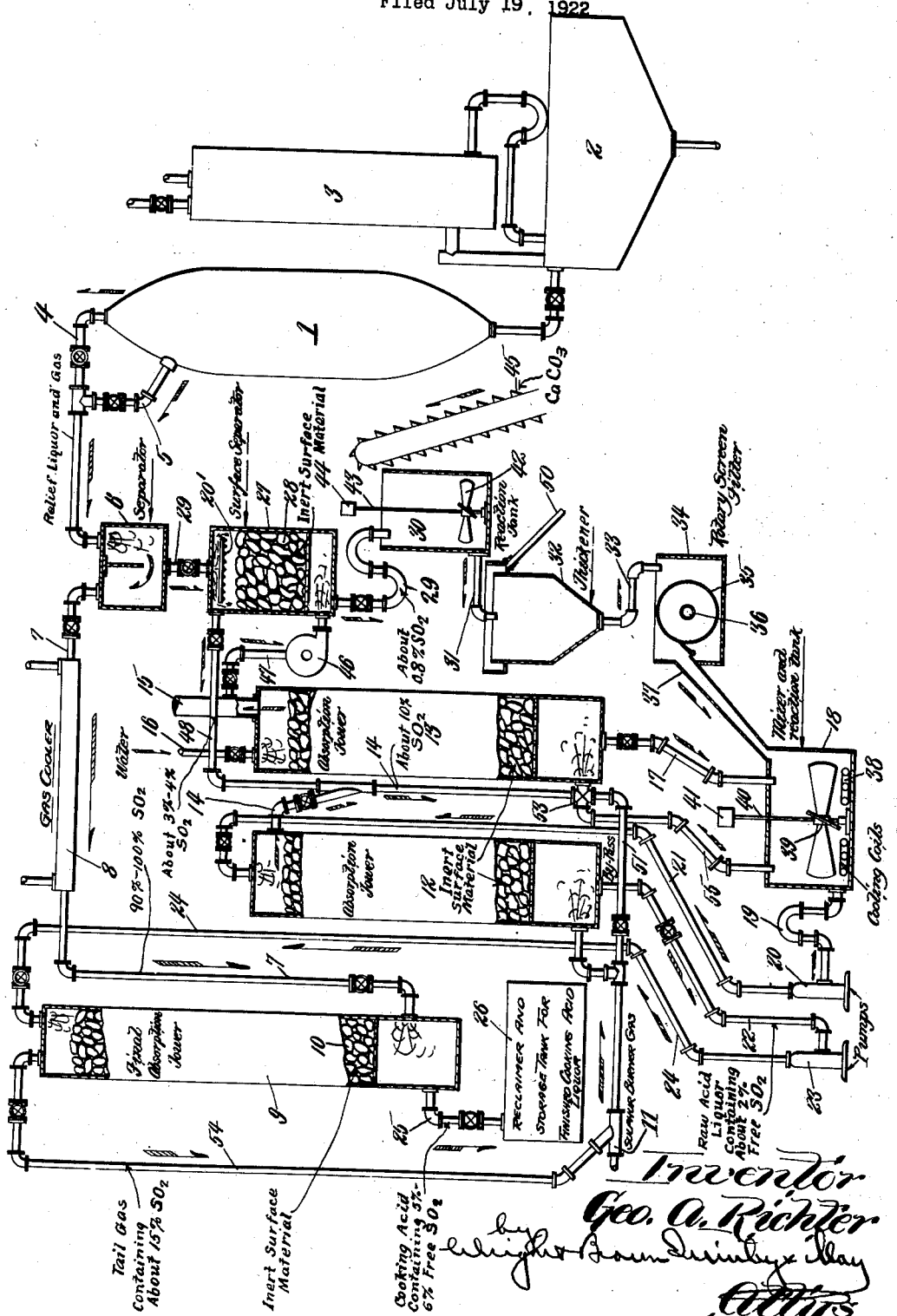
Inventor
Geo. A. Richter Patented Sept. 14, 1926.

1,599,488

UNITED STATES PATENT OFFICE.

GEORGE A. RICHTER, OF BERLIN, NEW HAMPSHIRE, ASSIGNOR TO BROWN COMPANY, OF BERLIN, NEW HAMPSHIRE, A CORPORATION OF MAINE.

METHOD OF MAKING SULPHITE COOKING LIQUORS.

Application filed July 19, 1922. Serial No. 575,949.

This invention has for its object to effect a greater recovery of sulphur from the waste liquor relieved from the digester during the operation of producing cellulose fibers by the sulphite digestion process than has heretofore been possible, as well as to provide improvements in the method of making sulphite cooking liquor.

It is customary in "acid systems" so-called to separate the relief gas from the relief liquor of the digester and to utilize such separated gas in fortifying or strengthening the sulphite solution in the acid system. The relief liquor which is separated from the gas, when treated according to the usual methods, is, without further treatment, delivered to the tank which contains the finished acid liquor ready for the next cooking operation. The effect of this, however, is to dilute the finished acid liquor with foreign matter contained in the relief liquor and also disadvantageously to raise the temperature of the acid liquor in the storage tank.

In my application for Letters Patent Serial No. 408,052, filed September 3, 1920, (resulting in Letters Patent No. 1,458,310, dated June 12, 1923), I have described a process by which it is possible to recover free $SO_2$ from the relief liquor by passing the liquor through a tower containing inert material, and, by means of tail gas from the absorption towers or other gas, sweeping from such liquor during its passage such portion of the free $SO_2$ as may be recovered thereby. But even with such treatment appreciable traces of free $SO_2$ remain in the relief liquor passing from the tower. Such relief liquor also contains sulphur in combination which has not been acted upon during the previous cooking operation and also sulphur which is in loose or unstable combination with the lignin content of such liquor.

An object of the present invention is to recover from the relief liquor such remaining traces of free $SO_2$, sulphur combined as calcium or magnesium bisulphite, and also the sulphur which is in unstable combination with the lignin constituents of the liquor.

On the accompanying drawing I have shown diagrammatically and more or less conventionally an acid system such as may be utilized in carrying out the present invention. Before explaining the process which embodies the present invention, I will briefly describe the apparatus.

On the drawing the digester is indicated at 1 and the blow pit at 2. At 3 I have indicated conventionally a tower for condensing the vomit stack gases and recovering $SO_2$ therefrom, which, however, forms no part of the present invention. From the upper portion of the digester 1 lead the valved relief pipes 4 and 5 which discharge the relief liquors and gases into a separator indicated at 6, where the greater portion of the gas is separated from the liquor. The gas, which flows from this separator through the pipe 7, is cooled by a cooling apparatus indicated conventionally at 8, and is delivered into the lower end of the tower 9, which is provided with inert spiral brick or other interstitial surface material, as indicated at 10. The purpose of this will be subsequently explained. In producing the raw acid liquor, it is customary to burn a sulphur-bearing material in a suitable furnace and to carry the products of combustion ($SO_2$) through towers where it is brought into contact with water and lime for the production of calcium bisulphite. At 11 I have indicated a pipe or conduit to which the burner gas is delivered. I have shown a two-tower system, the first tower being indicated at 12 and the second tower at 13. The sulphur burner gas is delivered at the lower end of the first tower 12, which is provided with a mass of inert interstitial material—spiral brick or the like. In passing upwards through the tower, the gas is caused to flow in countercurrent through trickling streams of liquor delivered to the top of the tower. From the upper end of the tower the unabsorbed gas flows through a pipe 14 downwardly to the lower end of the second tower 13, which is likewise provided with spiral brick or other inert interstitial material, the tail gas of this tower being vented through a large pipe 15. Water is sprayed into the top of the second tower 13 through the water pipe 16, and in passing downwardly through the interstitial material it is acidulated by the upward flow of $SO_2$ gas therethrough. This acidulated water is delivered through a valved pipe 17 to a mixing tank 18. From the mixing tank the liquor flows through the pipe or conduit 19 to a pump 20, by which it is forced through pipe 21 to the top of tower 12, and is sprayed so as to pass downwardly through the inert interstitial material therein. The liquor from the bottom of the tower 12 passes downwardly through pipe 22 to pump 23, which forces it through pipe 24 to the top of tower 9, so that it may be passed downwardly through the interstitial material therein. This liquor, as I will endeavor to explain, when delivered through the pipe 25 from tower 9, is the finished acid liquor which contains the maximum quantity of free $SO_2$. This finished liquor is delivered to a storage tank 26, from which it is drawn for the digestion of the wood in the digesters. I will explain subsequently how the liquor is strengthened and fortified as it is passed through the several towers 10, 12 and 13. Continuing a brief reference to the apparatus shown on the drawing, I have shown below the separator 6 a surface separator or scavenger tank 27, which is provided with a mass of inert interstitial material as indicated at 28. Relief liquor from the separator 6 passes downwardly through the valved pipe 29 to a spray head 20', and passes through the interstices of spiral brick or other inert surface material into tank 27 and is delivered through a pipe 29 to a mixing or reaction tank 30. From the mixing tank 30 the liquor passes through a pipe 31 to a thickener 32, from which it is delivered by pipe 33 to a rotary filter 34. This rotary filter is indicated only conventionally, it being understood that the liquor passes through the rotary screen 35, the filtrate being delivered through the outlet 36 and the precipitate being scraped by a doctor from the screen and passing downwardly through a conduit 37 to the mixing tank 18. This mixing tank is provided with any suitable form of agitators and may be equipped with cooling coils as indicated conventionally at 38. An agitator is indicated at 39, the shaft 40 thereof being provided with a pulley 41 by which it may be agitated with a suitable source of power.

The tank 30, which for convenience of designation I may refer to as the "reaction tank," is provided with an agitator 42, the shaft 43 of which is provided with a pulley 44 by which it may be rotated. To this reaction tank is delivered by means of a conveyor of any suitable form, as indicated at 45, measured quantities of calcium carbonate for purposes to be explained.

In carrying out this process, it is my purpose to effect two major results: first to recover from the relief liquor traces of free $SO_2$ and sulphur combined as calcium bisulphite or loosely combined with the lignin constituents of the relief liquor, and second, to dissolve the recovered precipitate in the acidulated water delivered from the second tower 13 of the acid system. Before delivering the relief liquor to the reaction tank into which finely divided calcium carbonate is delivered by the conveyor 45, I remove from the relief liquor as much as possible of the free $SO_2$ by sweeping it therefrom by tail gas from the second tower 13 of the acid system. For this purpose, a portion of such tail gas is pumped by a pump 46 through a pipe 47 which communicates with the tail gas pipe 15, the pumped gas being delivered into the lower end of the surface separator 27. In passing upwardly through the separator, the tail gas removes therefrom the greater part of the free $SO_2$, which passes therewith from the separator through a pipe 48, and is delivered preferably to the pipe 14 so as to be carried with the gas from the tower 12 to the lower end of the tower 13. The effect of this is, as stated, to remove from the relief liquor the greater portion of free $SO_2$ which has not been separated therefrom in the separator 6. The relief liquor which passes from the surface separator 27 still contains traces of free $SO_2$, and in addition contains some calcium bisulphite, and also contains complex bodies with which sulphur is in more or less unstable combination. I refer to these complex bodies generally by the term "lignin". This liquor, after passing through the surface separator, contains about 0.8% total sulphur, of which about 60% is recoverable in the succeeding operation. The relief liquor from the surface separator 27 passes into the reaction tank 30 to which is delivered calcium carbonate in finely divided or pulverulent form. The calcium carbonate reacts with the sulphur, forming calcium monosulphite which is insoluble. The relief liquor as it is delivered to the reaction tank 30 is at a relatively high temperature, approximately 180° F., so that the reaction takes place very rapidly. Calcium carbonate, however, is delivered to the reaction tank in excess of that required for reaction with the combined sulphur in the liquor, such excess depending upon the amount of total calcium required for the formation of the raw acid liquor in the acid system. The products of the reaction, the remaining relief liquor, and the calcium carbonate which has not been acted upon pass from the reaction tank to the thickener or settling tank 32. The overflow from the thickener 32 may be carried away to the sewer by the pipe 50. The thick suspension in the thickener passes to the filter indicated at 34, and the precipitate which is scraped from the screen 35 is delivered to the agitator tank 18. This precipitate consists of approximately equal amounts of calcium monosulphite and calcium carbonate. In this operation thus far described, practically all of the organic constituents of the relief liquor pass from the thickener 32 with the overflow therefrom and are wasted into the sewer, so that practically all of the sulphur and lime are separated therefrom and delivered to the agitator tank free from organic material. This insures against the dilution or contamination of the acid liquor used in the operation of the digester. The calcium carbonate and calcium monosulphite, delivered into the agitating or mixing tank 18, come in contact with the acidulated water delivered from the tower 13 and are converted to calcium bisulphite. It will be recalled that the liquor delivered to the top of this tower is water only, and that, as the water passes downwardly through the tower, it is acidulated by the gas delivered from the tower 12 of the acid system as well as by the gases delivered from the surface separator 27. From the surface separator the gas contains about 3% or 4% by volume of $SO_2$, and the tail gas from tower 12 contains about 10% $SO_2$. This mixture of gas, however, does not greatly dilute the gas delivered from tower 12, since the volume of gas in the surface separator is relatively small. In the event that the volume of gas from the surface separator should be such as to materially decrease the strength of the gas entering the lower end of tower 13, I provide a by-pass pipe 51 leading from the sulphur-burner gas pipe 11 to the lower end of tower 13. The pipes 51 and 14 are shown as connected to a coupling 53 provided with an inlet to the tower 13. The acidulated water from tower 13 as stated, is delivered to the mixing tank 18, where it reacts with the calcium monosulphite and calcium carbonate to form calcium bisulphite which is soluble. This clear liquor is now delivered to tower 12 where it comes in contact with the burner gases and is brought to a strength of about 2% free $SO_2$ and 1% combined $SO_2$. The calcium carbonate initially delivered to the reaction tank 30 is in sufficient quantity to provide for reaction with calcium bisulphite in the relief liquor and the formation of monosulphite and also to react with the acidulated water from tower 13, in proper proportions to provide the desired combined $SO_2$ in the raw acid liquor. The liquor, which is delivered from tower 12 and which may be referred to as the "raw acid liquor", is now pumped by pump 23 to the top of tower 9, where in passing downwardly through the inert interstitial material it comes in contact with the strong gas delivered from the first separator 6. This gas is from 90% to 100% free $SO_2$ and it is delivered by the pipe 7 to the lower end of the tower 9 as shown. In passing through this tower, the liquor, which as delivered from tower 12 has a content of about 2% free $SO_2$ and 1% combined $SO_2$, is strengthened or fortified until on being delivered to the reclaiming tank it contains from 5% to 6% free $SO_2$ and 1% combined $SO_2$. This liquor is clear and contains only traces of organic matter, and is referred to by me as the "finished acid liquor". When the system is first started in operation, the finished acid liquor delivered from the tower 9 contains approximately 4% free $SO_2$, but, as the digester and the system continue in operation, the strength of the finished liquor in $SO_2$ increases until it reaches a maximum of 6% to 6½%, dependent upon the temperature of the finished liquor leaving tower 9. The tail gas from tower 9 is still fairly rich in $SO_2$, containing about 15%, and is delivered by tail gas pipe 54 to the burner gas pipe so that it may mix with the burner gases, being in substantially the same degree of concentration as the burner gas itself.

I have herein referred to the fact that calcium carbonate is employed in the reaction tank, this for the following reasons: At the temperature at which the relief liquor is delivered from the surface separator to the reaction tank,—namely about 180° F.,—the calcium carbonate reacts quickly and to completion, precipitating available sulphur and calcium without causing a precipitation of organic matter from this liquor. Other basic materials, such as calcium hydroxide or sodium hydroxide, will cause a similar precipitation of sulphur and calcium constituents but will also produce precipitates of organic matter which interfere in the subsequent acid-making process. Consequently, while such material as calcium hydroxide and sodium hydroxide may be used without departing from the spirit and scope of the invention, nevertheless I prefer to use calcium carbonate for the reasons stated, as it enables me to produce a cooking liquor which is practically free from organic matter. A decided advantage of this process is that I am able to recover the unconverted calcium constituent of the relief liquor which may be in the form of calcium bisulphite which has not reacted with the ligneous matter of the wood and which being in solution would be wasted. The addition of the pulverulent calcium carbonate to the hot relief liquor causes the following reactions to take place: Free $SO_2$ present in the relief liquor is neutralized, thereby causing a precipitation as calcium monosulphite, of the calcium originating as calcium bisulphite in the relief liquor; and the remaining calcium carbonate reacts with sulphur dioxide which is loosely combined with organic matter to form calcium monosulphite. The calcium bisulphite in the relief liquor which has not been affected during the digestion, being in soluble form, would be wasted; and hence, in order that it may be recovered, it is necessary to reduce it to an insoluble form. This is accomplished, as previously stated, by the addition of calcium carbonate, according to the following reaction:

$$Ca(HSO_3)_2 + CaCO_3 = 2CaSO_3 + CO_2 + H_2O.$$

Sulphur is present in the relief liquor in the form of sulphonates or other bodies akin thereto, which are not affected by the presence of calcium carbonate, but there are other complex bodies in the relief liquor in which the sulphur in the form of $SO_2$ is in unstable combination. In the case of these latter bodies, they react with calcium carbonate to form calcium monosulphite and certain sulphur-freed reaction products. Such $CO_2$ as results from the reaction in the reaction tank preferably escapes into the atmosphere, since it will carry with it no appreciable amount of $SO_2$ gas, as the liquor in the tank is alkaline or neutral. Inasmuch, however, as there is a certain amount of $CO_2$, which is liberated in the mixing tank and which might carry with it a certain amount of $SO_2$ as the liquor in said tank is in an acid condition, I provide a vent 55 from this tank (which is preferably closed) to the coupling 53, where the $CO_2$ may pass through the second tower 13 and be wasted through the tail gas pipe 15, and the $SO_2$ utilized.

A further advantage of the process herein described is that I am able to control it. That is, since the absorption towers 12 and 13 contain only inert surface material, it is possible to deliver measured quantities of calcium carbonate, proportionate to the quantity of water delivered to the tower, to secure uniformity in combined $SO_2$ in the finished acid liquor. In the first instance, a reaction takes place in the reaction tank between a portion of the calcium carbonate and the free $SO_2$, calcium bisulphite and the unstable sulphur products of the relief liquor, and then in the mixing tank 18 the remainder of the calcium carbonate reacts with the water which was acidulated in the absorption tower 13, and all of the insoluble calcium compound is dissolved. In tower 12 the percentage of free $SO_2$ in the liquor is increased, but without any appreciable reaction between calcium carbonate and the acidulated water, although any insoluble calcium compound escaping from tank 12 will be dissolved. The rate of delivery of calcium carbonate to the tank 30 by the conveyer 45 may be varied by varying the speed of movement of the conveyer, and of course the flow of water to tower 13 may be easily controlled.

It is evident that changes may be made in the apparatus and in details of the process without departing from the spirit and scope of the invention as set forth in the claims. Without limitation thereto, but as an example,—instead of adding all of the basic material to the reaction tank 30, only sufficient need be added to combine with the sulphur constituents of the waste relief liquor, and the balance required for the reaction in the mixing tank 18 could be added directly to the tank 18.

I do not herein broadly claim specifically the process of recovering free $SO_2$ from the relief liquor. This is described and claimed in my application Serial No. 408,052, filed September 3, 1920.

What I claim is:—

1. A process of recovering sulphur from digester relief liquor containing combined sulphur, which comprises precipitating sulphur constituent in the form of insoluble monosulphite therefrom, but without effecting a substantial precipitation of organic matter; and then converting the monosulphite into bisulphite by sulphurous acid and recovering and using the same as a cooking liquor.

2. A process of recovering sulphur from digester relief liquor, which comprises separating $SO_2$ gas from the liquor; then precipitating sulphur constituent in the form of insoluble monosulphite therefrom, but without effecting a substantial precipitation of organic matter; separating the monosulphite from the remaining constituents of the liquor and converting the monosulphite to a bisulphite solution by reaction with $SO_2$ and water.

3. A process of recovering sulphur from digester relief liquor, which comprises separating $SO_2$ gas from the liquor; then precipitating the contained and free $SO_2$ calcium bisulphite and sulphur constituent loosely combined with organic matter, or as calcium monosulphite, but without effecting a substantial precipitation of organic matter; separating out the calcium monosulphite and converting the latter by $SO_2$ in water to a calcium bisulphite solution.

4. A process of recovering sulphur from digester relief liquor and forming a sulphite acid cooking liquor, which comprises separating and recovering $SO_2$ gas from such liquor; then acidulating water by causing it to absorb $SO_2$; adding pulverulent limestone in excess to digester relief liquor to precipitate contained sulphur constituent in the form of calcium monosulphite, but without causing a substantial precipitation of organic matter; separating the precipitated monosulphite and excess limestone from such liquor; and mixing said acidulated water with said separated monosulphite and limestone to form an acid bisulphite solution.

5. A process of recovering sulphur from digester relief liquor and forming a sulphite acid cooking liquor, which comprises acidulating water by causing it to absorb $SO_2$, adding a basic material of the alkali earth group in excess to digester relief liquor, and separating the precipitated monosulphite and excess basic material from such liquor; mixing said acidulated water with said separated monosulphite and basic material to form an acid bisulphite solution; and passing said solution and $SO_2$ gas in counter-current flow over inert surface material to strengthen said solution in free $SO_2$.

6. A process of recovering sulphur from digester relief liquor and forming a sulphite acid cooking liquor, which comprises acidulating water by causing it to absorb $SO_2$, adding a basic material of the alkali earth group in excess to digester relief liquor, and separating the precipitated monosulphite and excess basic material from such liquor; mixing said acidulated water with said separated monosulphite and basic material to form an acid bisulphite solution; passing said solution and $SO_2$ gas in counter-current flow over inert surface material to strengthen said solution in free $SO_2$; and finally passing said solution and substantially pure $SO_2$ in counter-current flow to produce a cooking acid liquor having a high percentage of free $SO_2$.

7. A process of making a sulphite cooking liquor, which comprises separating the substantially pure relief gas from the relief digester liquor; treating the relief liquor with finely divided calcium carbonate in excess; and separating the resulting calcium monosulphite and unconverted calcium carbonate from such liquor; acidulating water with $SO_2$ of sulphur burner gases; mixing said acidulated water with said separated monosulphite and carbonate to form a calcium bisulphite solution; and further acidulating said solution with $SO_2$.

8. A process of making a sulphite cooking liquor, which comprises separating the relief gas from the relief digester liquor; adding finely divided basic material of the alkali earth group in excess to said liquor to precipitate monosulphite and separting the monosulphite and unconverted basic material from said liquor; passing $SO_2$ and water in counter-current flow over inert surface material to acidulate said water; mixing said acidulated water and said last-mentioned monosulphite and basic material to form an acid bisulphite solution; increasing the acid strength of said solution by means of free $SO_2$; and further strengthening said solution with said relief gas to form a finished bisulphite liquor having a high percentage of free $SO_2$.

9. A process of making a sulphite cooking liquor, which comprises passing sulphur burner gases through a series of towers having inert surface material; passing water through the second of said towers and thereby acidulating said water with $SO_2$; separating the relief gas from digester relief liquor; adding finely divided calcium carbonate to said relief liquor to precipitate monosulphite; separating out said monosulphite and mixing it and basic material with said acidulated water; circulating the resulting solution through the first of said towers to strengthen it with $SO_2$; and finally passing said strengthened solution and said relief gas into contact to form a cooking liquor having a high free $SO_2$ content.

In testimony whereof I have affixed my signature.

GEORGE A. RICHTER.